United States Patent [19]

Markowski et al.

[11] Patent Number: 5,067,043
[45] Date of Patent: Nov. 19, 1991

[54] ELECTRIC POWER DISTRIBUTION PANELBOARD-SWITCHBOARD BUS BAR INSULATION SHIELD

[75] Inventors: Robert G. Markowski, East Haven; Denis A. Perzan, Plainville; John A. Morby, Farmington; Dean A. Robarge, New Britain, all of Conn.

[73] Assignee: General Electric Company, New York, N.Y.

[21] Appl. No.: 627,147

[22] Filed: Dec. 13, 1990

[51] Int. Cl.⁵ .............................................. H02B 1/20
[52] U.S. Cl. ................................ 361/361; 361/341; 361/346; 361/355
[58] Field of Search ................... 200/50 AA; 361/341, 361/342, 345, 346, 353, 355, 356, 358, 361, 363, 376

[56] References Cited

U.S. PATENT DOCUMENTS

| | | |
|---|---|---|
| 4,242,718 | 12/1980 | Shariff et al. .......................... 361/361 |
| 4,301,493 | 11/1981 | Schweikle et al. .................... 361/361 |
| 4,374,405 | 2/1983 | Olashaw et al. ...................... 361/361 |
| 4,744,003 | 5/1988 | Koslosky et al. ..................... 361/363 |
| 4,754,247 | 6/1988 | Raymont et al. ..................... 335/202 |
| 4,945,450 | 7/1990 | Sabatella et al. ..................... 361/334 |

FOREIGN PATENT DOCUMENTS 0121943 9/1979 Japan ................................... 361/345

OTHER PUBLICATIONS

Ser. No. 388,452 entitled "Electric Power Distribution Panelboard-Switchboard Assembly", filed 8/2/89, Morby et al.

Primary Examiner—Gregory D. Thompson
Attorney, Agent, or Firm—Richard A. Menelly; Walter C. Bernkopf; Fred Jacob

[57] ABSTRACT

A combination panelboard-switchboard housing accepts plug-on connection with a plurality of electric switch-circuit breaker modules. Circuit breakers can also be directly connected into the bus bars in a plug-on connection with minor modification. The bus bars are "edge-mounted" such that the minor dimension of the bus bars is perpendicular to the bottom of the housing to receive the modules as well as the circuit breakers, per se. Plastic or fiber insulation shields are arranged over those bus bars that are not connected with the circuit breakers or modules to prevent inadvertent contact with the bus bars when energized.

10 Claims, 3 Drawing Sheets

ELECTRIC POWER DISTRIBUTION PANELBOARD-SWITCHBOARD BUS BAR INSULATION SHIELD

BACKGROUND OF THE INVENTION

Electric power distribution panelboards and switchboards are currently available which accept circuit breakers and electric switches by means of a plug-on connection to the bus bars arranged therein. U.S. Pat. No. 4,744,003 describes one such panelboard arrangement. When electric switches or circuit breakers are to be installed on-site within such an operating panelboard or switchboard, the electric power must be temporarily discontinued and the panelboard or switchboard disassembled before such electric switch or circuit breaker can be installed. Where modifications must be made to the panelboard or switchboard interior in order to accept the electric switch or circuit breaker, some time is required before the power can be turned ON. This disruption in electric power within an industrial environment could cause scheduling problems both with respect to the related equipment as well as to operating personnel.

U.S. patent application Ser. No. 388,452, filed Aug. 2, 1989, entitled "Electric Power Distribution Panelboard-Switchboard Assembly", describes one such assembly which can accept circuit breakers and electric switches by means of a modular enclosure without requiring that the panelboard or switchboard be electrically de-energized.

With same panelboard and switchboard enclosures, it is often convenient to directly plug the electric switch or circuit breaker directly onto the edge-mounted electric bus bars with minor modification in which case the panelboard or switchboard must be de-energized to prevent damage to the equipment as well as to personnel. To deter electrical circuit with the bus bars in the event that the enclosure becomes inadvertently energized, some means should be employed to prevent direct access at all times to those bus bars that are not connected with the modular enclosures, electric switches or circuit breakers.

U.S. Pat. No. 4,754,247, entitled "Molded Case Circuit Breaker Accessory Enclosure", describes a circuit breaker having an electronic trip unit and accessory devices mounted within the circuit breaker cover and accessed by means of an accessory cover without affecting the integrity of the circuit breaker case which contains the circuit breaker operating components such as the operating mechanism, contacts and arc chute. A wire access slot formed within the circuit breaker case allows for the egress of the wire conductors leading to the accessories while an arc vent slot formed within the circuit breaker case adjacent the arc chute provides supplemental gas venting to the arc gases that are generated during circuit interruption. When such side-vented circuit breakers are used within panelboards and switchboards containing the edge-mounted bus bars, the bus bars should be shielded from direct contact with the arc gas by-products that accompany the arc gas evolution from the vent slot.

Accordingly, one purpose of this invention is to provide convenient and inexpensive bus bar insulation shields that are removably replaceable and which can be installed either at the factory or on-site.

SUMMARY OF THE INVENTION

The invention comprises replaceable electric insulation shields for use within panelboard and switchboard housings containing a plurality of edge-mounted power bus bars. The housings accept a plurality of electric switch-circuit breaker modular modules containing electric switches and circuit breakers that connect with the bus bars. Circuit breakers and switches can connect directly with the bus conductors, per se with minor modification. A plurality of flexible plastic or fiber electric insulation shields are positioned over the bus bars to prevent inadvertent contact with the energized bus bars as well as to shield the bus bars from the gaseous by-products issuing from the circuit breakers during circuit interruption.

DESCRIPTION OF THE PREFERRED EMBODIMENT

For purposes of this disclosure, a switchboard is defined as "a self-standing array of circuit interruption devices rated up to a particular ampere value". A panelboard is defined as "a wall mounted device that includes an array of circuit interruption devices up to a rating less than that of a switchboard". A switchboard can comprise a plurality of individual panelboards mounted within a common self-standing enclosure.

Figure 1:
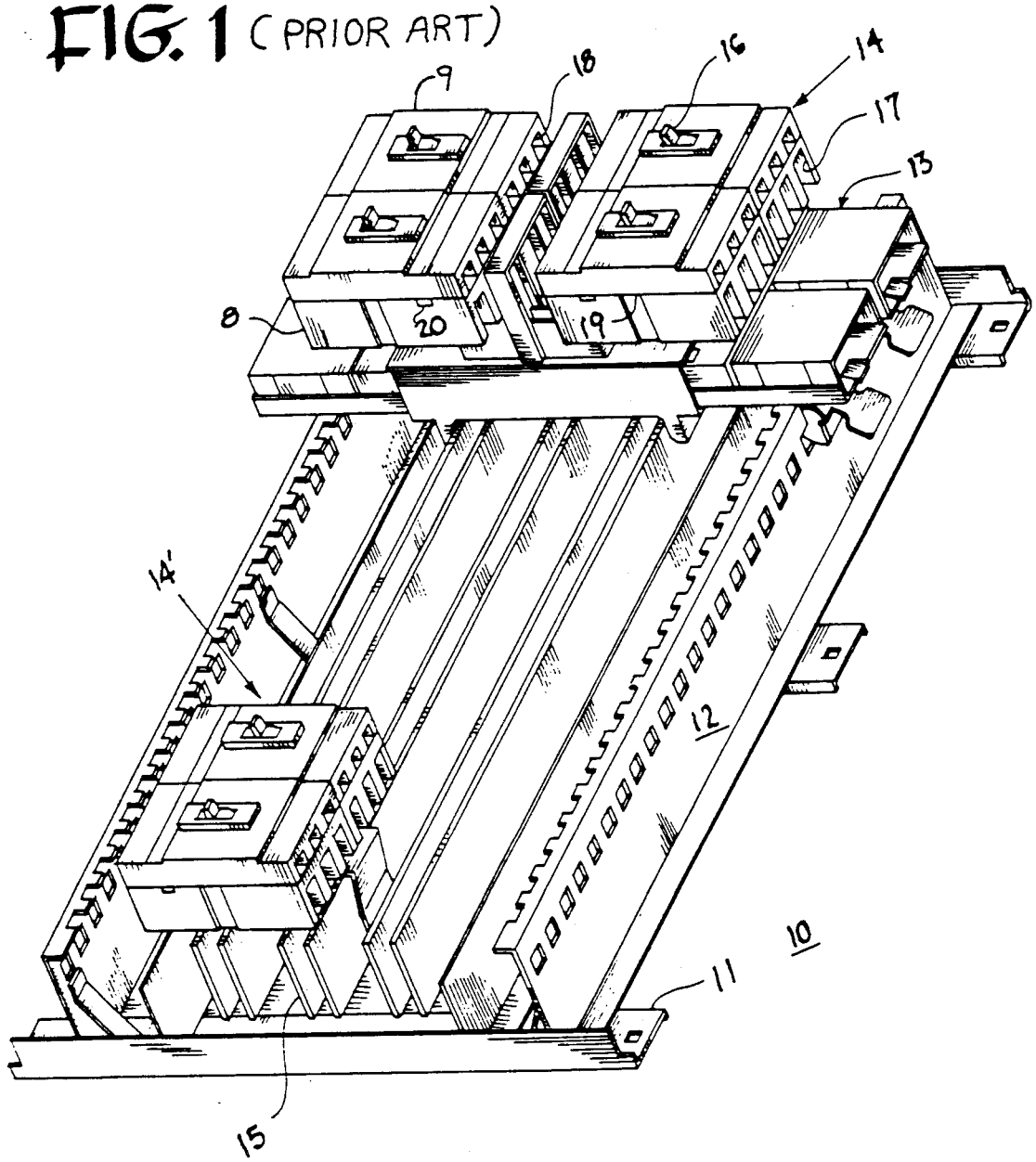
FIG. 1 is a top perspective view of the interior of a panelboard or switchboard enclosure according to the prior art.

The panelboard or switchboard interior 10 of FIG. 1 accepts a wide range of circuit interruption devices which are attached to the interior by means of an electric switch-circuit breaker enclosure module 13 (hereafter "module") such as described within the aforementioned U.S. patent application Ser. No. 388,452. The module can contain a pair of electric switches (not shown) or a pair of circuit breakers, as indicated at 14 and 14'. The circuit breakers are electrically connected with the edge-mounted bus bars 15 upon attachment of the module 13 with the Z-shaped side rails 12 upstanding on opposite sides of the interior supports 11. The circuit breakers are turned from their ON and OFF conditions by means of the externally accessible operating handles 16 which extend through the circuit breaker cover 9 as well as through the cover of the panelboard or switchboard enclosure (not shown). As described within the aforementioned U.S. Pat. No. 4,945,450, the arc gases generated during overcurrent circuit interruption vent through the exhaust gas openings 18 arranged on the line side of the circuit breaker case 8. An additional side vent 20 is also arranged through the circuit breaker case to provide additional arc gas release when the circuit is interrupted under severe overcurrent condition. The wire slots 19 formed within the circuit breaker case provide a channel for the electrical conductors (not shown) that are used to electrically connect with the accessories contained within the circuit breaker cover. When modified, as described earlier, the circuit breakers and electric switches can be directly plugged onto the edge-mounted bus bars 15 as illustrated by the directly-connected circuit breakers 14'.

Figure 2:
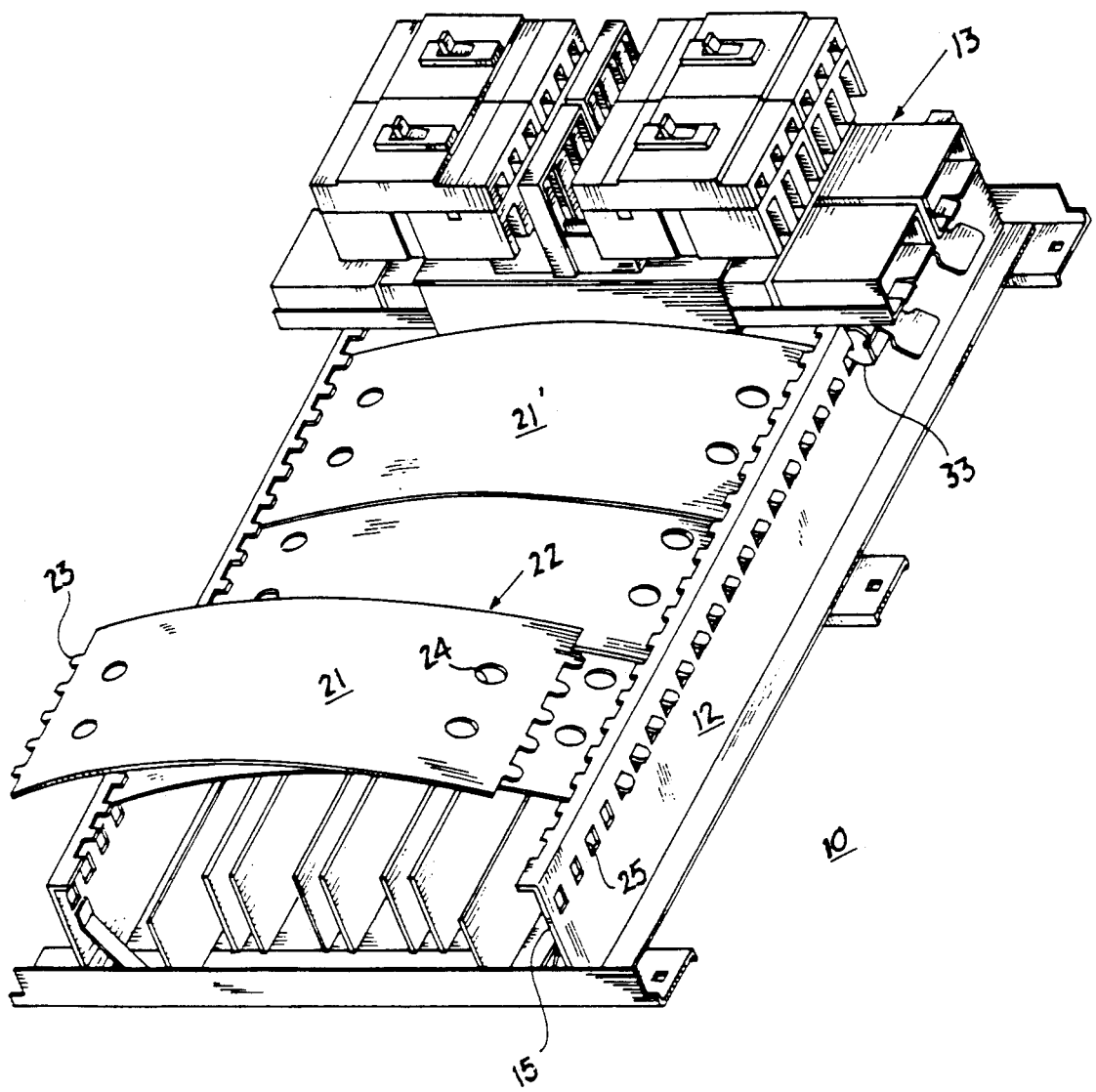
FIG. 2 is a top perspective view of the panelboard or switchboard interior of FIG. 1 depicting the bus bar insulation shields according to the invention.

In accordance with the invention, a flexible bus bar insulating shield 21 as shown in FIG. 2 is positioned over the edge-mounted bus bars 15 by grasping the apertures 24 formed at opposing ends of the shield and positioning the tabs 23 extending from the opposite ends of the shield within the rectangular slots 25 formed within the Z-shaped side rails 12. The shields are in the form of a rectangular sheet 22 of a flexible fiber or plastic material. The arcuate configuration of one such attached shield is depicted at 21', where the arc-shaped configuration gives over-surface clearance to the edge-mounted bus bars 15 and thereby prevents the shield from contacting the bus bars directly. It is noted that the tabs 23 on the insulating shields 21 share the same rectangular slots 25 that receive the hook-shaped connectors 33 extending from the bottom of the electric switch-circuit breaker module 13. This multi-functional use of the rectangular slots 25 insures the operator that either a module will be connected within the slots or that the slots will be used to attach the insulating shields and, hence, provide a safety check such that all the rectangular slots should be occupied to insure that the interior 10 is in a safe operating condition. It is further noted that the tabs 23 on adjoining insulating shields 21 can share the same rectangular shaped slots to overlap one another for additional safety.

Figure 3:
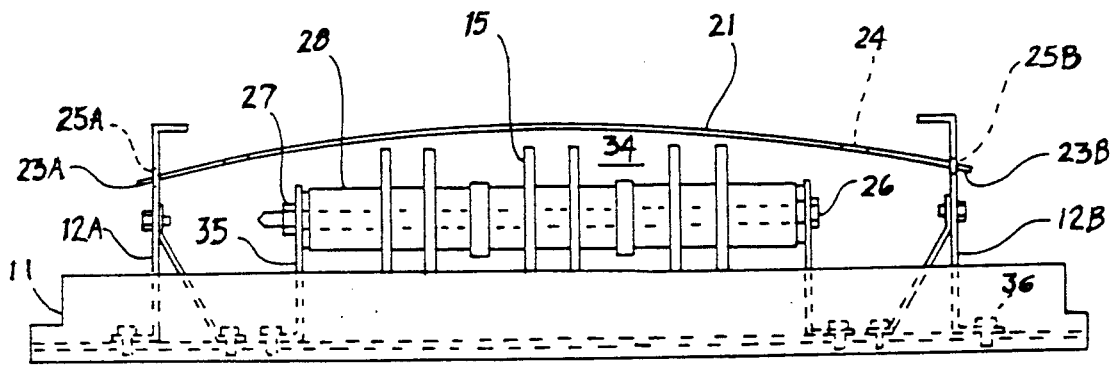
FIG. 3 is an end view of the panelboard or switchboard interior of FIG. 2.

The interior 10 is depicted in FIG. 3 with the circuit breakers and electric switch-circuit breaker modules removed to detail the arcuate shape of the attached insulating shield 21' when positioned between a pair of opposing Z-shaped side rails 12A, 12B with corresponding tabs 23A, 23B inserted within corresponding rectangular slots 25A, 25B, as illustrated. The space 34 defined between the bottom of the insulating shield and the top of the edge-mounted bus bars 15 provide the over-surface clearance to the adjoining bus bars for additional electrical clearance between the adjoining bus bars. As described within the aforementioned U.S. patent application Ser. No. 388,452, the edge-mounted bus bars 15 are separated by means of tubular insulators 28 and are supported by means of an elongated threaded bolt 26 which extends between the upright support brackets 35 and is securely fastened by means of the nut 27. The upright support brackets are, in turn, securely fastened to the interior supports 11 by means of bolts 36, as indicated.

Figure 4:
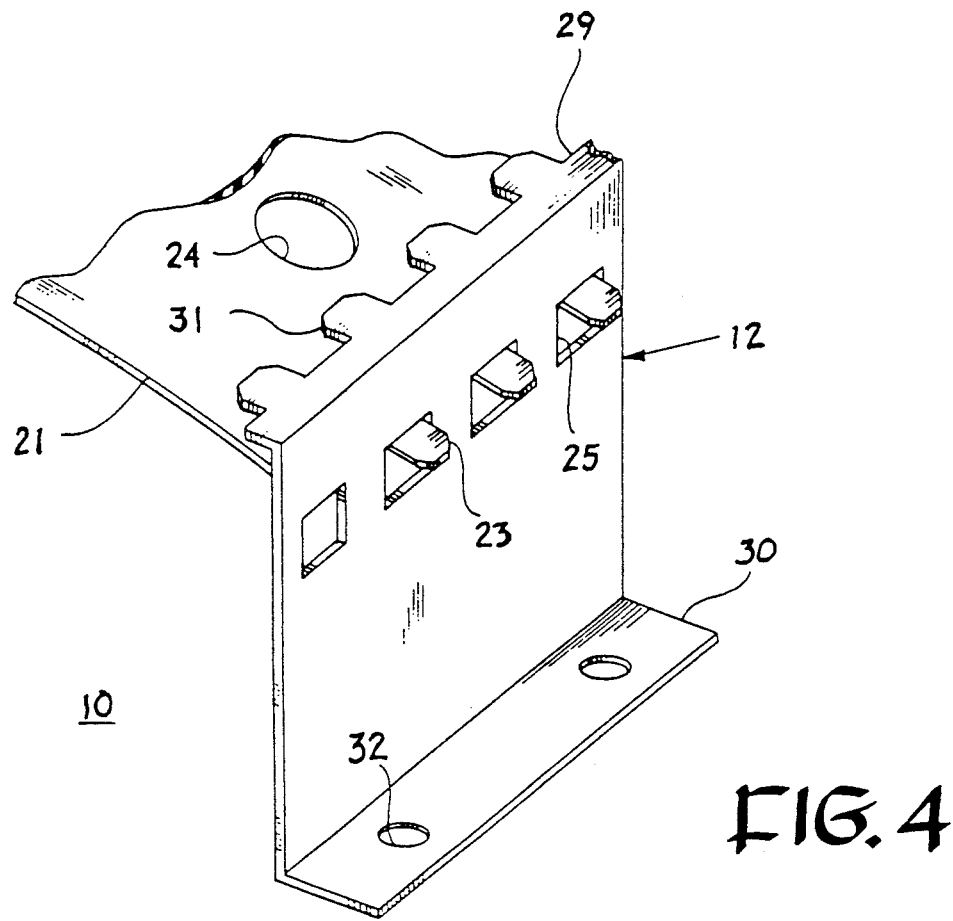
FIG. 4 is an enlarged top perspective view of a partial section of the panelboard or switchboard interior of FIG. 2 depicting the connection between the bus bar insulation shields and the interior.

A portion of the Z-shaped side rails 12 on the interior 10 is shown in FIG. 4 to illustrate the offset top steps 29 and opposing offset bottom steps 30. The tabs 31 extending from the offset top steps 29 overhang the edges of the insulating shields 2 when the insulating shield tabs 23 are positioned within the rectangular slots 25. The apertures 24, formed near the edges of the insulating shields 21 to provide a means for grasping the edges of the insulating shields for both inserting and removing the shields, are located close to the tabs 31 extending from the Z-shaped side rails to position the apertures away from the underlying edge-mounted bus bars 15, as best seen by referring to FIGS. 3 and 4. This insures that there is no line-of-sight path extending between the circuit breaker side vents 20 of FIG. 1 and the edge-mounted bus bars 15 of FIG. 3. The bolts 36 that attach the Z-shaped side rails 12 to the interior supports 11 pass through the apertures 32 formed within the offset bottom steps 30 of the Z-shaped side rails as best seen in FIG. 4.

Flexible, electrical insulating bus bar shields have herein been described for preventing inadvertent contact with edge-mounted bus bars contained within a switchboard or panelboard interior. The insulating shields are both inserted and removed from the interior by the cooperation of the tabs extending from the bus bar shields and the rectangular slots already existing within the Z-shaped side rails attached to the switchboard or panelboard interior.

Having thus described our invention, what we claim as new and desire to secure by Letters Patent is:

1. An interior for an electric switch or circuit breaker enclosure comprising:
   support means supporting a plurality of electric switches or circuit breakers;
   a plurality of electric bus bars extending along said support means and arranged for connecting with said electric switches or circuit breakers;
   a pair of support rails arranged at opposing ends of said support means, said support rails including a plurality of slots through said support rails; and
   an electrically insulating shield removeable attaching between said support rails and arranged over said bus bars thereby preventing access to said bus bars.

2. The interior of claim 1 including a plurality of tabs extending from opposite ends of said insulating shield, said tabs being inserted within said slots to thereby attach said insulating shield to said support means.

3. The interior of claim 1 wherein said insulating shield comprises a sheet of plastic or fiber.

4. The interior of claim 2 including manual access slots formed within said insulating shield proximate said ends facilitating attachment and removal of said insulating shield.

5. The interior of claim 4 wherein said access slots are distal said bus bars to thereby prevent line-of-sight path between said switches and said circuit breakers and said bus bars.

6. The interior of claim 1 wherein said support means comprise Z-shaped rails.

7. The interior of claim 1 wherein said bus bars are edge-mounted on said support means.

8. An electrically-insulating bus bar shield comprising:
   a sheet of plastic or fiber material having a pair of opposing ends;
   at least one tab extending from each of said opposing ends providing means for removably attaching to a panelboard or switchboard interior; and
   at least one aperture formed proximate said ends providing manual engagement means for ease in attaching and removing said shield from the interior.

9. The shield of claim 8 wherein said sheet is adapted for flexing between parallel supports extending along the interior.

10. The shield of claim 9 wherein said at least one tab is adapted to extend withhin at least one corresponding slot formed within the supports.

* * * * *